US012261348B2

(12) United States Patent
Lee et al.

(10) Patent No.: US 12,261,348 B2
(45) Date of Patent: Mar. 25, 2025

(54) ANTENNA DEVICE HAVING CONTACT STRUCTURE BASED ON CONDUCTIVE GASKET

(71) Applicant: LS MTRON LTD., Anyang-si (KR)

(72) Inventors: Seung Hwan Lee, Anyang-si (KR); Yong Sung Yim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 341 days.

(21) Appl. No.: 17/806,226

(22) Filed: Jun. 9, 2022

(65) Prior Publication Data

US 2022/0399633 A1 Dec. 15, 2022

(30) Foreign Application Priority Data

Jun. 11, 2021 (KR) ........................ 10-2021-0076108
Feb. 18, 2022 (KR) ........................ 10-2022-0021590
May 3, 2022 (KR) ........................ 10-2022-0054848

(51) Int. Cl.
*H01Q 1/22* (2006.01)
*H01Q 1/00* (2006.01)
(Continued)

(52) U.S. Cl.
CPC ........... *H01Q 1/2283* (2013.01); *H01Q 1/002* (2013.01); *H01Q 1/005* (2013.01); *H01Q 1/38* (2013.01);
(Continued)

(58) Field of Classification Search
CPC ...... H01Q 1/2283; H01Q 1/002; H01Q 1/005; H01Q 7/00; H01Q 1/38; H01R 11/09; H01R 4/489; H01R 13/115
See application file for complete search history.

(56) References Cited

U.S. PATENT DOCUMENTS 6,024,585 A * 2/2000 Mickievicz .............. H01Q 7/00 343/702
2008/0007480 A1 1/2008 Chun
(Continued)

FOREIGN PATENT DOCUMENTS

CN 107516778 A 12/2017
EP 3082191 A2 10/2016
(Continued)

OTHER PUBLICATIONS

Extended European Search Report for related European Application No. 22176784.1; action dated Nov. 10, 2022; (6 pages).

*Primary Examiner* — Dieu Hien T Duong
*Assistant Examiner* — Yonchan J Kim
(74) *Attorney, Agent, or Firm* — K&L Gates LLP

(57) ABSTRACT

Disclosed is an antenna device having a contact structure, and the antenna device includes: a radiator formed on a carrier; a printed circuit board having a power supply module configured to supply a power supply signal to the radiator; and a first contact structure configured to electrically connect the radiator and the printed circuit board, wherein the first contact structure includes: a conductive gasket formed with a through hole therein, installed on the radiator to be fixed onto the radiator; a torsion suppression member inserted into the conductive gasket through the through hole to suppress the torsion of the conductive gasket; and a separation suppression member extending from the radiator along an outer wall of one side of the conductive gasket in a height direction of the conductive gasket to suppress the separation of the conductive gasket.

13 Claims, 11 Drawing Sheets

(51) Int. Cl.

| | |
|---|---|
| ***H01Q 1/38*** | (2006.01) |
| ***H01Q 7/00*** | (2006.01) |
| ***H01R 4/48*** | (2006.01) |
| ***H01R 13/115*** | (2006.01) |

(52) U.S. Cl.

CPC ............... *H01Q 7/00* (2013.01); *H01R 4/489* (2013.01); *H01R 13/115* (2013.01)

(56) References Cited

U.S. PATENT DOCUMENTS

| | | | | |
|---|---|---|---|---|
| 2016/0336642 A1* | 11/2016 | Makimura | ............... | H01Q 1/24 |
| 2020/0396872 A1 | 12/2020 | Kim et al. | | |

FOREIGN PATENT DOCUMENTS

| | | | | | |
|---|---|---|---|---|---|
| JP | 4572225 B2 | 8/2010 | | | |
| KR | 101254188 B1 | 4/2013 | | | |
| WO | WO-2018117447 A1 * | 6/2018 | ............... | H01G 2/14 | |

* cited by examiner

ANTENNA DEVICE HAVING CONTACT STRUCTURE BASED ON CONDUCTIVE GASKET

CROSS-REFERENCE TO RELATED APPLICATIONS

This application claims the benefit of the Korean Patent Applications No. 10-2021-0076108 filed on Jun. 11, 2021, No. 10-2022-0021590 filed on Feb. 18, 2022, and No. 10-2022-0054848 filed on May 3, 2022 which are hereby incorporated by reference as if fully set forth herein.

FIELD

The present disclosure relates to an antenna device, and more specifically, to an omni-directional antenna.

BACKGROUND

In an antenna, a contact structure is used to electrically connect a radiator to a main printed circuit board (PCB).

In the case of a general antenna, as shown in FIG. 1, a radiator is electrically connected to a printed circuit board using a finger-type contact structure 100', or as shown in FIG. 2, a radiator is electrically connected to a printed circuit board through a C-clip type contact structure 200.

However, when the radiator and the printed circuit board are connected using the finger-type contact structure 100' shown in FIG. 1 or the C-clip-type contact structure 200 as shown in FIG. 2, due to vibration or impact generated during use of the antenna, since a connection between the radiator and the printed circuit board becomes unstable or, in severe cases, the contact structure itself is damaged, and thus a contact point failure can occur, there is a problem that the maximum performance of the antenna is limited.

SUMMARY

The present disclosure is directed to providing an antenna device having a contact structure using a conductive gasket capable of stably maintaining an electrical connection between a radiator and a printed circuit board even when vibration or impact occurs.

Further, the present disclosure is directed to providing an antenna device having a contact structure using a conductive gasket which may be fixed to a radiator without soldering.

In addition, the present disclosure is directed to providing an antenna device having a contact structure using a conductive gasket capable of preventing damage to an inner wall of the conductive gasket by friction when the conductive gasket is compressed by a printed circuit board.

In addition, the present disclosure is directed to providing an antenna having a contact structure using a conductive gasket whose thickness distribution may be uniformly maintained when the conductive gasket is compressed by a printed circuit board.

One aspect of the present disclosure provides an antenna device having a contact structure using a conductive gasket, including: a radiator (120) formed in a predetermined pattern on a carrier (110); a printed circuit board (140) on which a power supply module configured to supply a power supply signal to the radiator (120) through a power supply unit is mounted; and a first contact structure (130*a*) configured to electrically connect the radiator (120) and the printed circuit board (140), wherein the first contact structure (130*a*) includes: a conductive gasket (400) formed with a through hole (412) therein, installed to have a first height (h1) on the radiator (120), and compressed by the printed circuit board (140) to be fixed onto the radiator (120); a torsion suppression member (440) inserted into the conductive gasket (400) through the through hole (412) to suppress the torsion of the conductive gasket (400); and a separation suppression member (450) configured to extend from the radiator (120) along an outer wall of one side of the conductive gasket (400) in a height direction of the conductive gasket (400) to suppress the separation of the conductive gasket (400).

In one embodiment, the torsion suppression member (440) may be integrally formed with the separation suppression member (450), and the torsion suppression member (440) may be formed by bending a portion of the separation suppression member (450).

In this case, the torsion suppression member (440) may include: a flat plate (442) formed to extend from one end of the separation suppression member (450) into the through hole (412); a first lower curved plate (444) formed by bending from one side of the flat plate (442) in a direction of a lower inner wall (420) of the conductive gasket (400) in the through hole (412); and a second lower curved plate (446) formed by bending from the other side of the flat plate (442) in the direction of the lower inner wall (420) of the conductive gasket (400) in the through hole (412).

The flat plate (442) may be located to be spaced apart from an upper inner wall (418) of the conductive gasket (400) in the through hole (412) by a predetermined distance when the conductive gasket (400) is not compressed, and the flat plate (442) may guide the upper inner wall (418) of the conductive gasket (400) to be compressed up to an upper surface of the flat plate (442) when the conductive gasket (400) is compressed.

The antenna device having a contact structure using a conductive gasket according to one aspect of the present disclosure may further include a fixing rib (150) disposed to face the separation suppression member (450) with the conductive gasket (400) interposed therebetween to fix the conductive gasket (400).

The fixing rib (150) may be formed on the carrier (110) to a second height (h2) to come into contact with an outer wall (416) of the other side of the conductive gasket (400).

Further, the fixing rib (150) may be integrally formed with the carrier (110).

In this case, the fixing rib (150) may be formed to have a second height (h2) lower than the first height (h1) of the conductive gasket (400), and may guide the conductive gasket (400) to be compressed up to an upper surface of the fixing rib (150) when the conductive gasket (400) is compressed by the printed circuit board (140).

In one embodiment, the conductive gasket (400) may include: a body formed of a silicon material; and a metal layer formed on an outer surface of the body to surround the body. Meanwhile, an upper outer wall (422) of the conductive gasket (400) may be formed to have a predetermined curvature, and an upper inner wall of the conductive gasket (400) may be formed to have the same curvature as the upper outer wall (422) of the conductive gasket (400).

The antenna device having a contact structure using a conductive gasket according to one aspect of the present disclosure may further include a second contact structure (130*b*) configured to electrically connect the radiator (120) to the printed circuit board (140). In this case, the first contact structure (130*a*) may electrically connect the radiator to the power supply unit, and the second contact structure (130*b*) may electrically connect the radiator (120) to a ground unit formed on the printed circuit board (140).

According to the above-described embodiment, the antenna device may further include a fixing rib (150) disposed between the first contact structure (130*a*) and the second contact structure (130*b*) to simultaneously fix the conductive gasket (400) of the first contact structure (130*a*) and the conductive gasket (400) of the second contact structure (130*b*).

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Meanings of terms described in the present specification should be understood as follows.

It should be understood that a singular form also includes a plural form unless otherwise defined, terms such as "first", "second", and the like are provided to distinguish one component from other components, and the scope should not be limited by these terms.

It should be understood that a term such as "include", "including", "have", "having", or the like does not preclude the presence or addition of one or more other features, integers, steps, operations, components, parts, and/or a combination thereof.

The term "or" includes any and all combinations of the words listed together. For example, "A or B" may include A, may include B, or may include both A and B.

It should be understood that the term "at least one" includes all possible combinations from one or more related items. For example, the meaning of "at least one of the first, second, and third items" refers to a combination of all items which may be proposed from two or more of the first item, the second item, and the third item, as well as each of the first item, the second item, or the third item.

When a certain component is mentioned as being "connected" or "linked" to another component, it should be understood that the certain component may be directly connected or linked to the other component, but still another component may be present therebetween. On the other hand, when it is mentioned that the certain component is "directly connected" or "directly linked" to another element, it should be understood that there is no other component therebetween.

Here, an embodiment of the present disclosure will be described with reference to the accompanying drawings.

Figure 1:
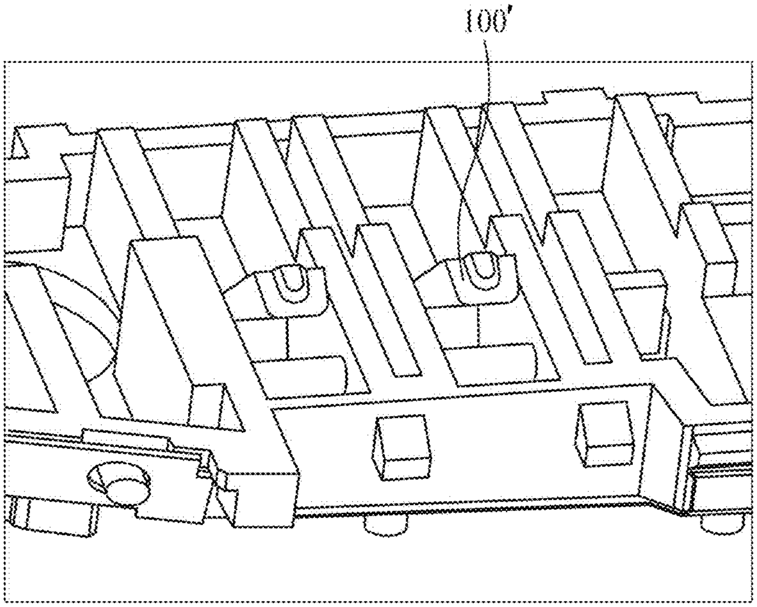
FIG. 1 (Prior Art)
FIG. 1 is a view illustrating a finger-type contact structure.
Figure 2:
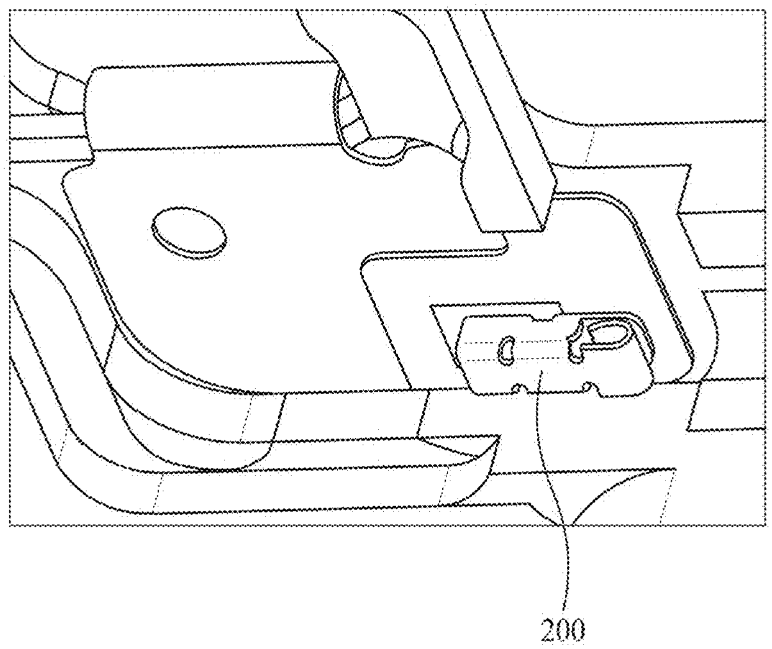
FIG. 2 (Prior Art)
FIG. 2 is a view illustrating a C-clip type contact structure.
Figure 3A:
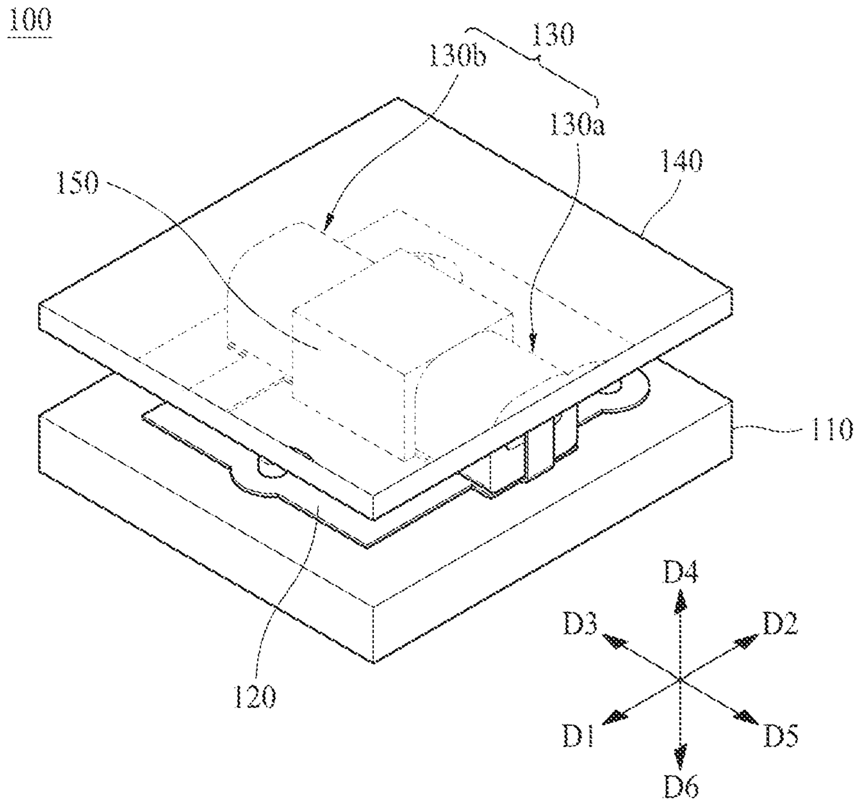
FIG. 3A is a perspective view of an antenna device having an antenna contact structure using a conductive gasket according to one embodiment of the present disclosure.
Figure 3B:
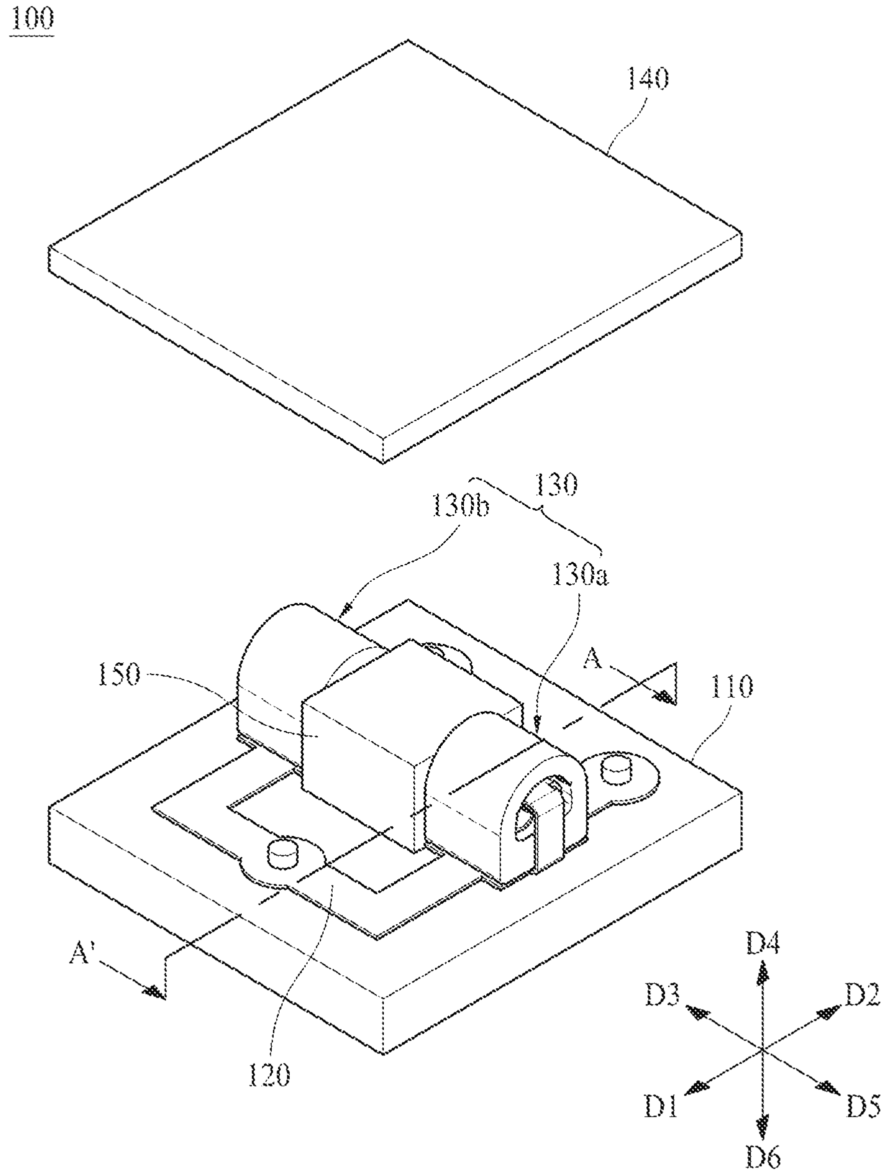
FIG. 3B is a partially exploded perspective view of the antenna device shown in FIG. 3A.
Figure 4A:
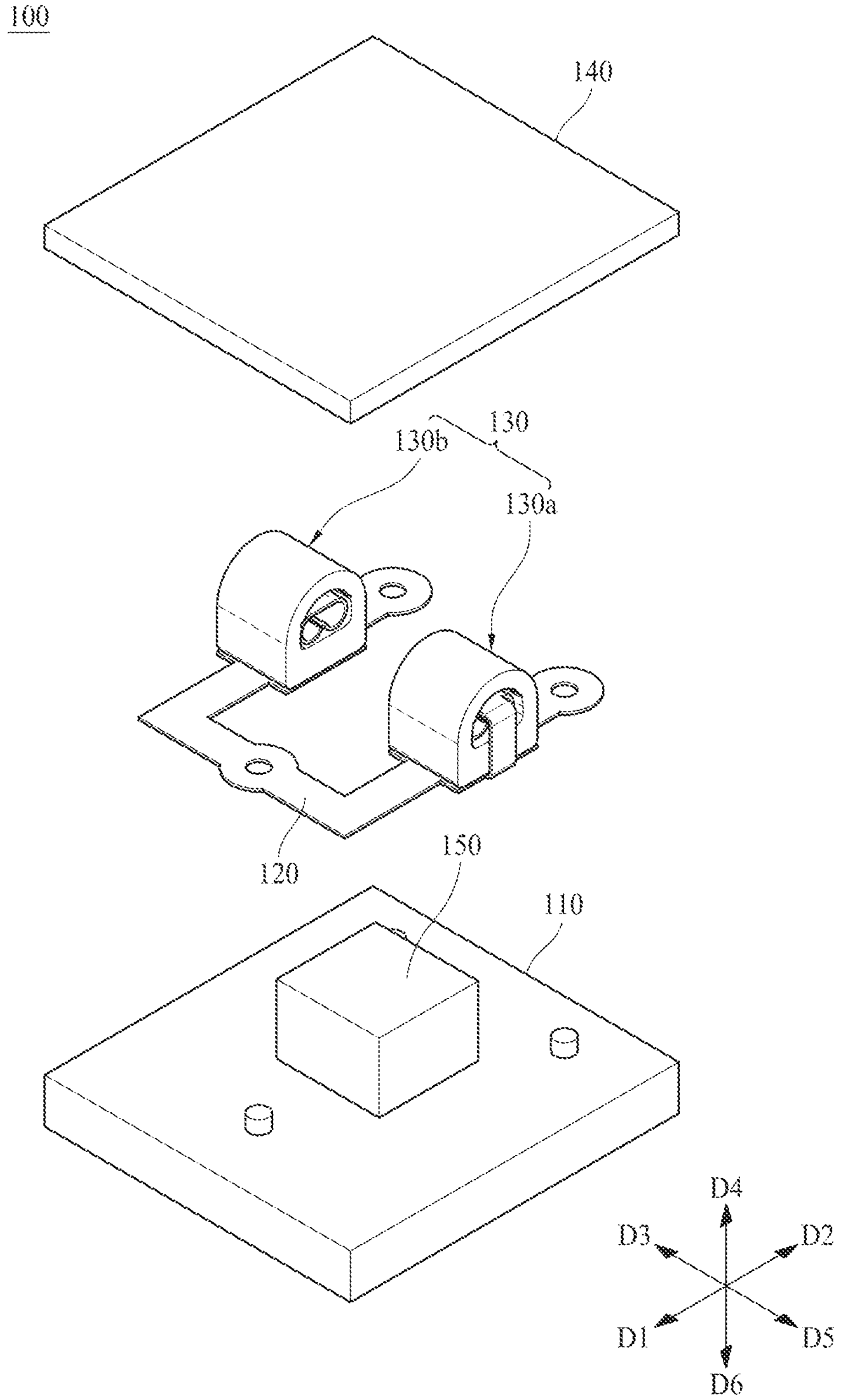
FIG. 4A is an exploded perspective view of the antenna device shown in FIG. 3A.
Figure 4B:
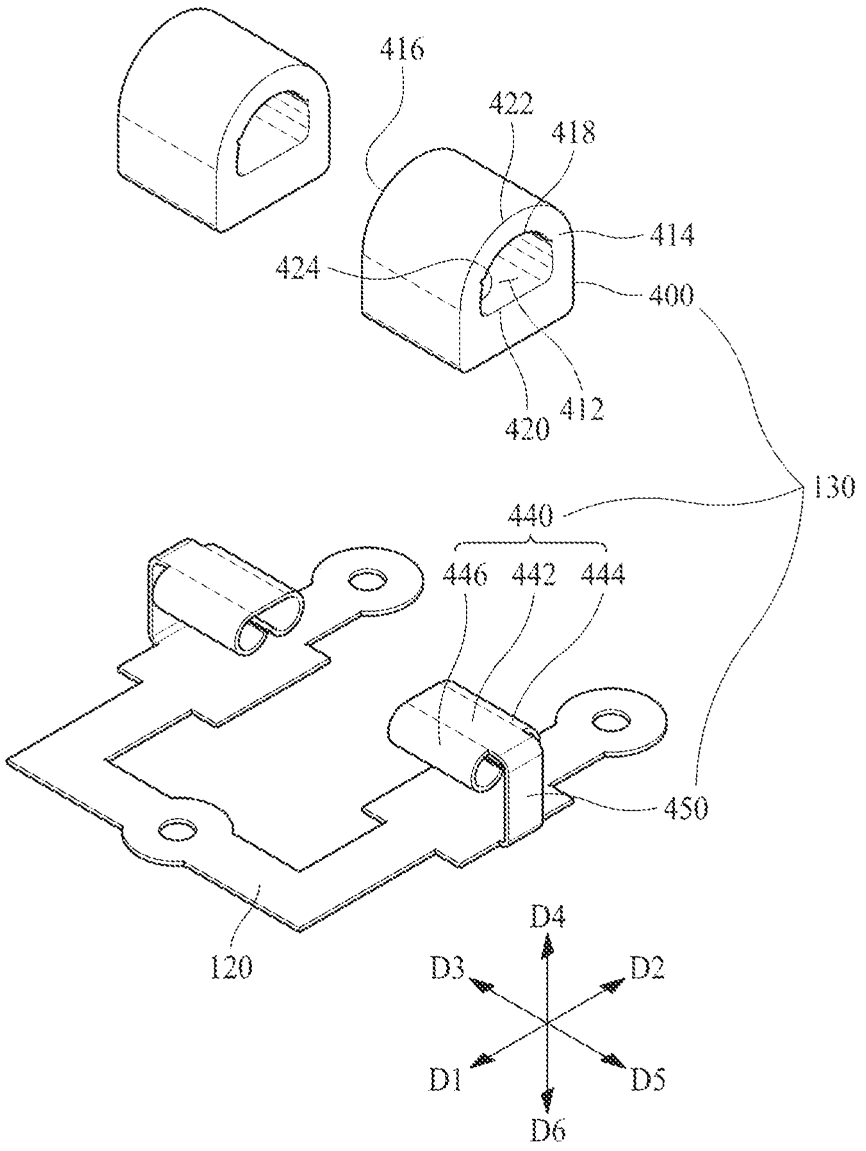
FIG. 4B is an exploded perspective view of the contact structure shown in FIG. 4A.
Figure 5:
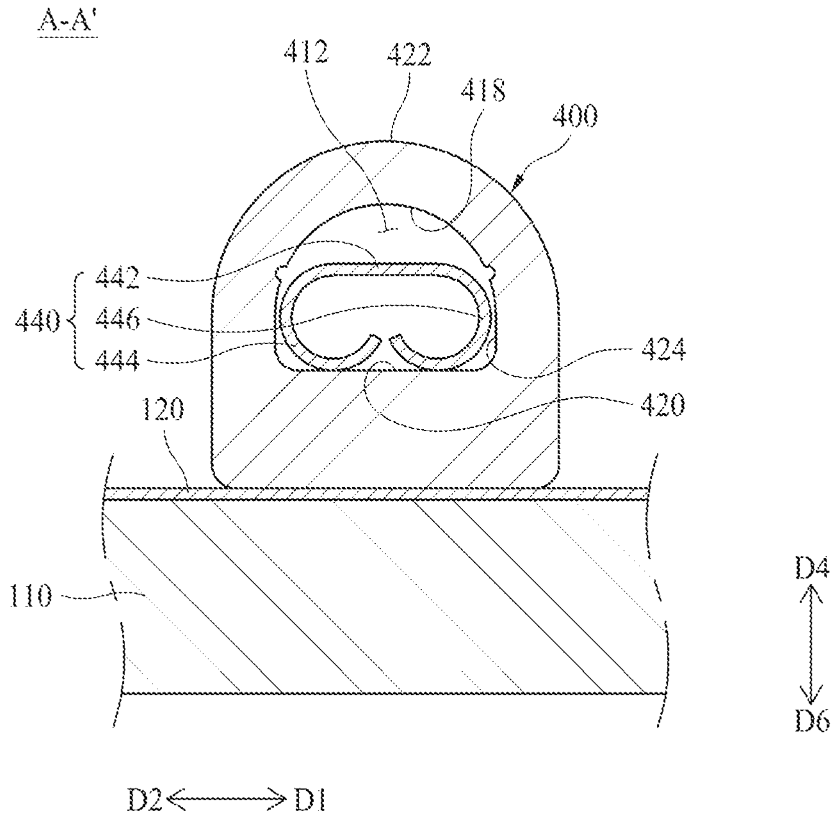
FIG. 5 is a cross-sectional view taken along line A-A' of FIG. 3B.

FIG. 3A is a perspective view of an antenna device having an antenna contact structure using a conductive gasket according to one embodiment of the present disclosure, FIG. 3B is a partially exploded perspective view of the antenna device shown in FIG. 3A, FIG. 4A is an exploded perspective view of the antenna device shown in FIG. 3A, FIG. 4B is an exploded perspective view of a contact structure according to one embodiment of the present disclosure, and FIG. 5 is a cross-sectional view taken along line A-A' of FIG. 3B.

As shown in FIGS. 3A to 5, the antenna device having the antenna contact structure using the conductive gasket according to one embodiment of the present disclosure (hereinafter, referred to as an 'antenna device 100') includes a carrier 110, a radiator 120, a contact structure 130, and a printed circuit board 140. Further, the antenna device 100 according to the present disclosure may further include a fixing rib 150 as shown in FIGS. 3A to 5.

Hereinafter, for convenience of description, a case in which the antenna device 100 according to the present disclosure includes the fixing rib 150 is described, but in another embodiment, the antenna device 100 according to the present disclosure may optionally include the fixing rib 150.

The carrier 110 constitutes a body of the antenna device 100, and the radiator 120, the contact structure 130, and the fixing rib 150 according to the present disclosure are formed on the carrier 110. Specifically, the fixing rib 150 according to the present disclosure may be integrally formed with the carrier 110 when the carrier 110 is molded. In one embodiment, the carrier 110 and the fixing rib 150 may be molded through an injection process.

When the carrier 110 is formed through the injection process, the carrier 110 may be formed of a polymer material. For example, the carrier 110 may include at least one among polycarbonate (PC), polypropylene (PP), polyimide (PI), polyamide (PA), polyethylene terephthalate (PET), and acrylonitrile-butadiene-styrene (ABS). However, one embodiment of the present disclosure is not limited thereto, and the carrier 110 may be formed of other materials as long as they are polymer materials. In one embodiment, when the radiator 120 according to the present disclosure is formed on the carrier 110 through plating, the carrier 110 may be formed of a polymer material which may be plated.

The carrier 110 according to the present disclosure may be coupled to a wireless device or a vehicle, or may be a part of a wireless device or a vehicle. FIGS. 3A, 3B, and 4A exemplarily illustrate the carrier 110, and the carrier 110 is not limited to the shape shown in the drawing and may be configured in various shapes.

The radiator 120 is formed on the carrier 110 in a predetermined pattern. The radiator 120 is formed of a conductive metal. In one embodiment, the radiator 120 may be formed by attaching a conductive metal pattern onto a surface of the carrier 110. In this case, the conductive metal pattern may be fixed onto the surface of the carrier 110 by a fusion method.

In another embodiment, the radiator 120 may be formed on the carrier 110 using a plating process. For example, the radiator 120 is formed by filling a conductive metal in a radiator pattern. The radiator pattern may be formed in the carrier 110 to a predetermined depth. According to this embodiment, the radiator 120 is formed using copper as a main raw material, and a material such as nickel, gold, or the like may be added in the plating process.

The contact structure 130 electrically connects the radiator 120 and the printed circuit board 140. In one embodiment, as shown in FIGS. 3A to 4B, the contact structure 130 according to the present disclosure may be a plurality of contact structures 130. For example, the contact structures 130 may include a first contact structure 130*a* and a second contact structure 130*b*.

Since detailed configurations of the first contact structure 130*a* and the second contact structure 130*b* are the same, hereinafter, the configuration of the contact structure 130 will be described based on the configuration of the first contact structure 130*a*. For convenience of description, the first contact structure 130*a* will be referred to as the contact structure 130.

The contact structure 130 includes a conductive gasket 400, a torsion suppression member 440, and a separation suppression member 450.

The conductive gasket 400 is formed to have a first height h1 on the radiator 120. The conductive gasket 400 is formed with a through hole 412 therein. The conductive gasket 400 may be compressed by the printed circuit board 140 to be fixed onto the radiator 120. That is, as the printed circuit board 140 compresses an upper outer wall 422 of the conductive gasket 400, the conductive gasket 400 may be fixedly coupled to the radiator 120.

To this end, the conductive gasket 400 may be formed of a material having an elastic force and a restoring force. In one embodiment, the conductive gasket 400 may include a body formed of a silicon material and a metal layer formed on an outer surface of the body to surround the body. In this case, the metal layer may be formed of a stainless (SUS) material.

Like the above, according to the present disclosure, since the contact structure 130, which electrically connects the radiator 120 and the printed circuit board 140, is formed using the conductive gasket 400 having an elastic force and a restoring force, even when vibration or impact occurs while the wireless device or vehicle in which the antenna device 100 is installed is used, a stable electrical connection between the printed circuit board 140 and the radiator 120 is ensured, and accordingly, the antenna device 100 may be implemented with maximum performance.

Further, since the conductive gasket 400 is formed of the material having an elastic force, the elastic force and the restoring force are constantly maintained even when the contact structure 130 is repeatedly used, and thus the reliability of electrical contact between the radiator 120 and the printed circuit board 140 may be secured.

In one embodiment, the conductive gasket 400 may be formed so that the upper outer wall 422 thereof has a predetermined curvature. In the present disclosure, the upper outer wall 422 of the conductive gasket 400 is formed to have the predetermined curvature so that the compressed conductive gasket 400 may be uniformly spread in first and second directions D1 and D2 when the conductive gasket 400 is compressed by the printed circuit board 140.

Like the above, according to the present disclosure, when the conductive gasket 400 is compressed by the printed circuit board 140, since the compressed conductive gasket 400 may be uniformly spread in the first and second directions D1 and D2, the thickness distribution of the conductive gasket 400 may be uniformly maintained, and accordingly, a current flow in the conductive gasket 400 becomes uniform, and thus the performance of the antenna device 100 may be improved.

Meanwhile, in the conductive gasket 400, an upper inner wall 418 of the conductive gasket 400 may also be formed to have the same curvature as the upper outer wall 422 of the conductive gasket 400. In this case, the upper inner wall 418 of the conductive gasket 400 refers to a wall formed at an upper inner side of the conductive gasket 400 by the through hole 412. As described above, according to the present disclosure, as the upper inner wall 418 of the conductive gasket 400 is also formed to have a curvature, the thickness distribution uniformity of the conductive gasket 400 may be maximized when the conductive gasket 400 is compressed by the printed circuit board 140, and accordingly, the uniformity of a current flow in the conductive gasket 400 may also be further improved.

Referring to FIGS. 3A to 5 again, the torsion suppression member 440 is inserted into the conductive gasket 400 through the through hole 412 formed in the conductive gasket 400 to suppress the torsion of the conductive gasket 400. That is, since the torsion suppression member 440 according to the present disclosure is disposed in the through hole 412 to suppress movement of the conductive gasket 400 in the first and second directions D1 and D2, the torsion of the conductive gasket 400 which occurs when the conductive gasket 400 moves in the first and second directions D1 and D2 may be prevented.

In one embodiment, the torsion suppression member 440 may include a flat plate 442, a first lower curved plate 444, and a second lower curved plate 446 as shown in FIGS. 4B and 5.

The flat plate 442 is disposed to be spaced apart from the upper inner wall 418 of the conductive gasket 400 by a predetermined distance in the through hole 412. Accordingly, the flat plate 442 may serve as a stopper which guides the upper inner wall 418 of the conductive gasket 400 to be compressed only up to an upper surface of the flat plate 442 when the conductive gasket 400 is compressed by the printed circuit board 140.

In one embodiment, the flat plate 442 may be integrally formed with the separation suppression member 450. Specifically, the flat plate 442 may be formed to extend in a third direction D3 from one end of the separation suppression member 450.

The first lower curved plate 444 is formed by bending from one side of the flat plate 442 in a direction of a lower inner wall 420 of the conductive gasket 400 in the through hole 412.

The second lower curved plate 446 is formed by bending from the other side of the flat plate 442 in the direction of the lower inner wall 420 of the conductive gasket 400 in the through hole 412.

In the present disclosure, the first lower curved plates 444 and second lower curved plates 446 constituting the torsion suppression member 440 are each formed in a curved shape to prevent damage to the inner wall of the conductive gasket 400 by friction between the torsion suppression member 440 and the lower inner wall 420 and a side inner wall 424 of the conductive gasket 400 when the conductive gasket 400 is compressed by the printed circuit board 140.

In the above-described embodiment, it has been described that the flat plate 442, the first lower curved plate 444, and the second lower curved plate 446 constituting the torsion suppression member 440 are separate components separated from each other. However, in a modified embodiment, the flat plate 442, the first lower curved plate 444, and the second lower curved plate 446 may be integrally formed using the same material.

According to this embodiment, the first lower curved plate 444 may be formed by rolling one short side of a quadrangular-shaped plate (not shown) having long sides extending in the first and second directions D1 and D2 in the direction of the lower inner wall 420 of the conductive gasket 400, and the second lower curved plate 446 may be formed by rolling the other short side of the quadrangular-shaped plate in the direction of the lower inner wall 420 of the conductive gasket 400. In this case, a region between the first lower curved plate 444 and the second lower curved plate 446 among the quadrangular-shaped plate constitutes the flat plate 442.

Figure 8:
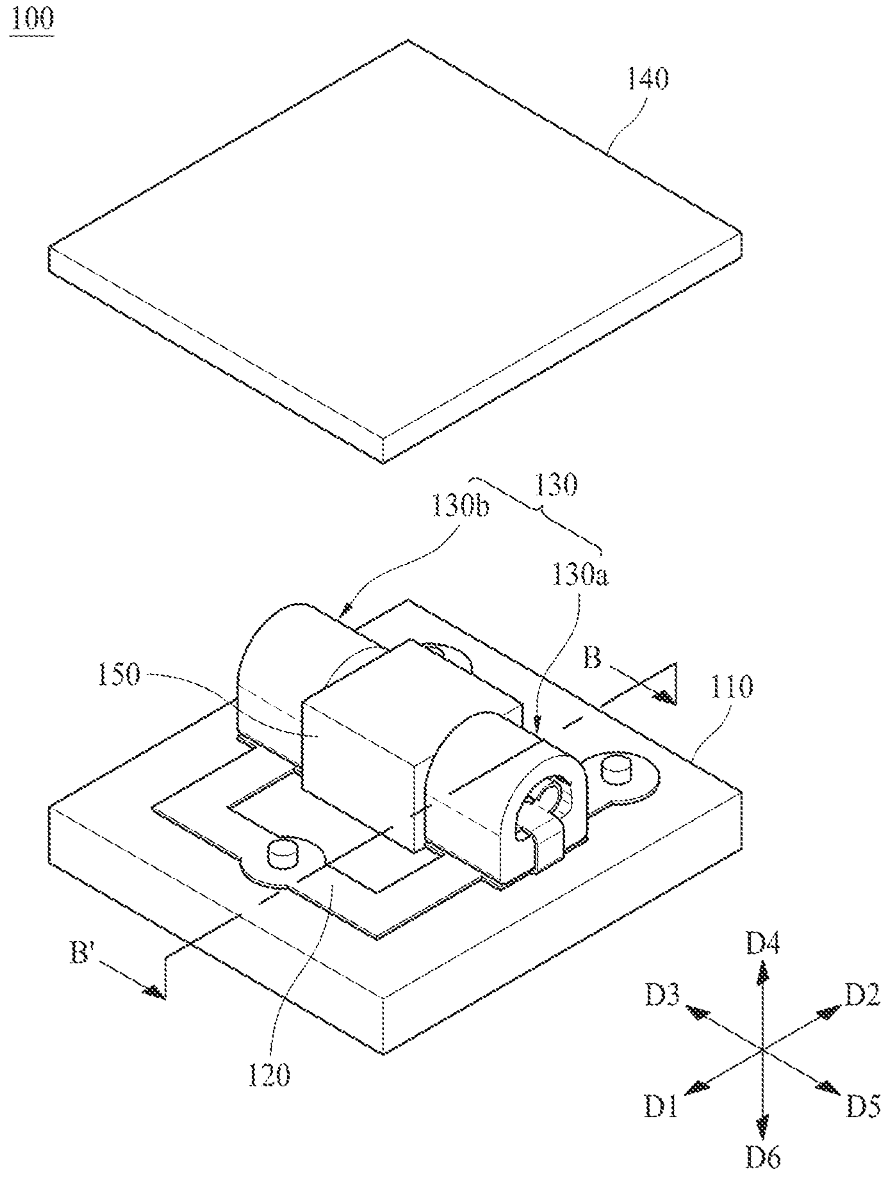
FIG. 8 is a partially exploded perspective view of an antenna device having an antenna contact structure using a conductive gasket according to one embodiment of the present disclosure.
Figure 9:
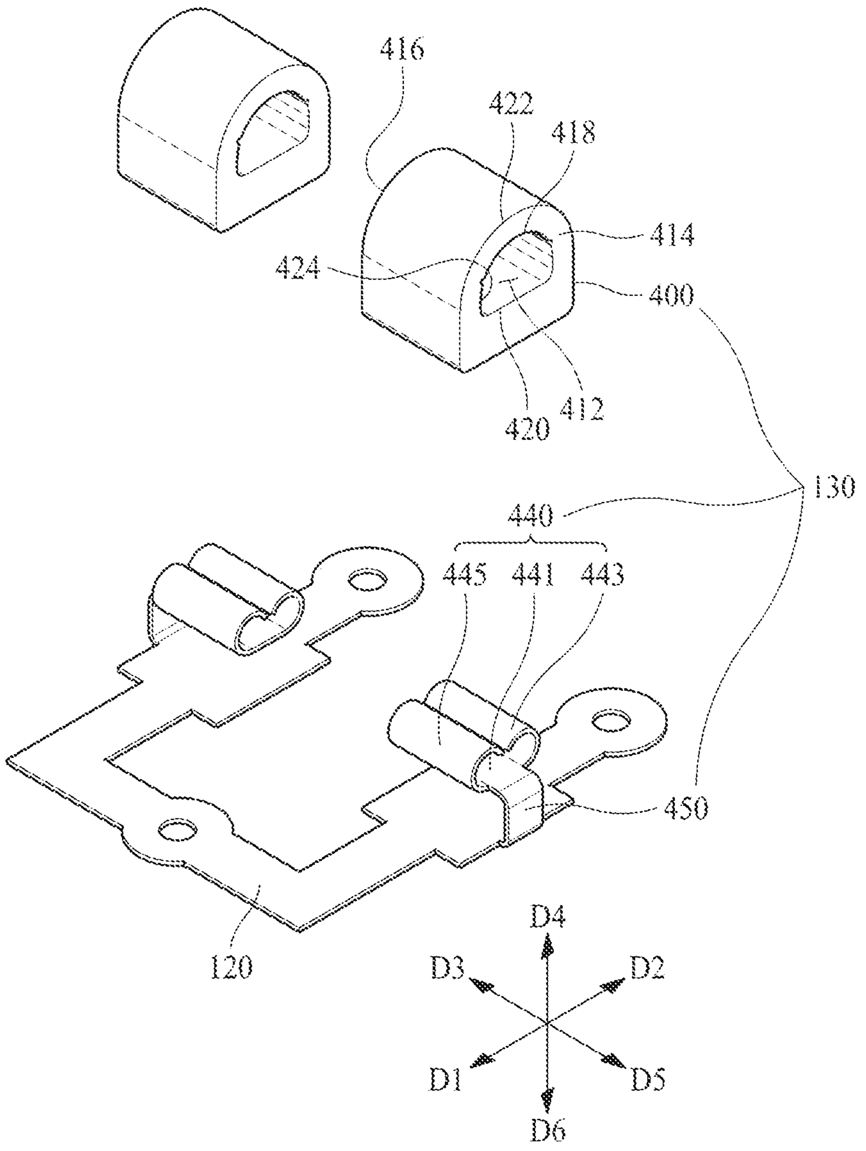
FIG. 9 is an exploded perspective view of the contact structure shown in FIG. 8.
Figure 10:
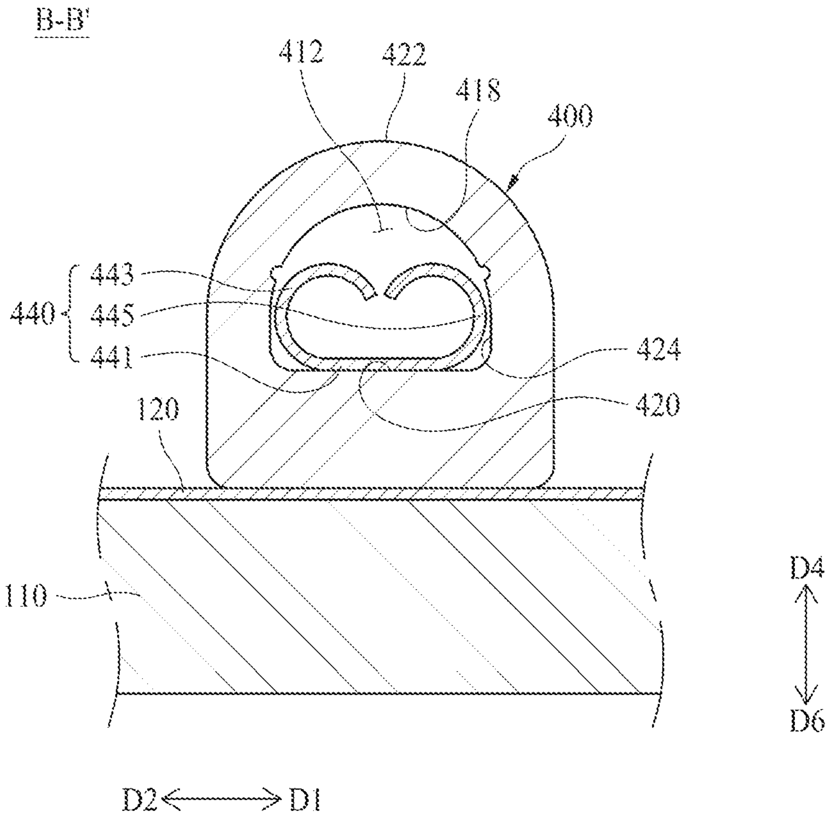
FIG. 10 is a cross-sectional view taken along line B-B' of FIG. 8.

In one embodiment, as shown in FIGS. 8 to 10, the torsion suppression member 440 may include a base plate 441, a first upper curved plate 443, and a second upper curved plate 445.

The base plate 441 extends from one end of the separation suppression member 450 into the through hole 412. The base plate 441 may pressurize the lower inner wall 420 of the conductive gasket 400 in the through hole 412 in a sixth direction D6 when the conductive gasket 400 is compressed.

The first upper curved plate 443 is disposed to be spaced apart from the upper inner wall 418 of the conductive gasket 400 by a predetermined distance in the through hole 412. Accordingly, the first upper curved plate 443 may limit a distance in which the upper inner wall 418 of the conductive gasket 400 may move in the sixth direction D6 when the conductive gasket 400 is compressed by the printed circuit board 140.

The second upper curved plate 445 is disposed to be spaced apart from the upper inner wall 418 of the conductive gasket 400 by a predetermined distance in the through hole 412. Accordingly, the second upper curved plate 445 may limit the distance in which the upper inner wall 418 of the conductive gasket 400 may move in the sixth direction D6 when the conductive gasket 400 is compressed by the printed circuit board 140.

The first upper curved plate 443 may be formed by bending from one side of the base plate 441 in a direction of the upper inner wall 418 of the conductive gasket 400 in the through hole 412. The second upper curved plate 445 may be formed by bending from the other side of the base plate 441 in a direction of the upper inner wall 418 of the conductive gasket 400 in the through hole 412.

In the present disclosure, the first and second upper curved plates 443 and 445 constituting the torsion suppression member 440 are each formed in a curved shape to smoothly restore the conductive gasket 400 compressed by the printed circuit board 140. This will be looked as follows.

First, looking at with reference to the first upper curved plate 443, the first upper curved plate 443 may be located to be spaced apart from the upper inner wall 418 of the conductive gasket 400 in the through hole 412 when the conductive gasket 400 is not compressed. Here, when the conductive gasket 400 is compressed, the uppermost end of the first upper curved plate 443 and the upper inner wall 418 of the conductive gasket 400 may realize line contact. Accordingly, in the present disclosure, since the uppermost end of the first upper curved plate 443 and the upper inner wall 418 of the conductive gasket 400 are smoothly spaced apart from each other after coming into contact with each other by concentrating a pressure on a specific region of the upper inner wall 418 of the conductive gasket 400, the restoring force of the conductive gasket 400 may be maximized. Accordingly, the present disclosure may be implemented so that the conductive gasket 400 may be more smoothly restored compared to a comparative example in which the upper inner wall 418 of the conductive gasket 400 is pressurized through surface contact.

Next, looking at with reference to the second upper curved plate 445, the second upper curved plate 445 may be located to be spaced apart from the upper inner wall 418 of the conductive gasket 400 in the through hole 412 when the conductive gasket 400 is not compressed. Here, when the conductive gasket 400 is compressed, the uppermost end of the second upper curved plate 445 and the upper inner wall 418 of the conductive gasket 400 may realize line contact. Accordingly, in the present disclosure, since the uppermost end of the second upper curved plate 445 and the upper inner wall 418 of the conductive gasket 400 are smoothly spaced apart from each other after coming into contact with each other by concentrating the pressure on a specific region of the upper inner wall 418 of the conductive gasket 400, the restoring force of the conductive gasket 400 may be maximized. Accordingly, the present disclosure may be implemented so that the conductive gasket 400 may be more smoothly restored compared to the comparative example in which the upper inner wall 418 of the conductive gasket 400 is pressurized through surface contact.

In one embodiment, the base plate 441 may be integrally formed with the separation suppression member 450. Specifically, the base plate 441 may be formed to extend in the third direction D3 from one end of the separation suppression member 450.

In the above-described embodiment, it has been described that the base plate 441, the first upper curved plate 443, and the second upper curved plate 445 constituting the torsion suppression member 440 are separate components separated from each other. However, in a modified embodiment, the base plate 441, the first upper curved plate 443, and the second upper curved plate 445 may be integrally formed using the same material.

According to this embodiment, the first upper curved plate 443 may be formed by rolling one short side of the quadrangular-shaped plate (not shown) having long sides extending in the first and second directions D1 and D2 in the direction of the upper inner wall 418 of the conductive gasket 400, and the second upper curved plate 445 may be formed by rolling the other short side of the quadrangular-shaped plate in the direction of the upper inner wall 418 of the conductive gasket 400. In this case, a region between the first upper curved plate 443 and the second upper curved plate 445 among the quadrangular-shaped plate constitutes the base plate 441.

Referring to FIG. 4B and FIG. 9 again, the separation suppression member 450 is installed at one side of the conductive gasket 400 to prevent separation of the conductive gasket 400. Specifically, since the separation suppression member 450 is installed to come into contact with an outer wall 414 of one side of the conductive gasket 400 to prevent the conductive gasket 400 from moving in a fifth direction D5, the separation of the conductive gasket 400 is suppressed.

To this end, the separation suppression member 450 may be formed to extend in a fourth direction D4, which is a height direction of the conductive gasket 400, from the radiator 120 along the outer wall 414 of one side of the conductive gasket 400.

In one embodiment, the above-described torsion suppression member 440 and separation suppression member 450 may be integrally formed. For example, when the separation suppression member 450 is formed to include a quadrangular-shaped plate having long sides extending in the first and second directions D1 and D2 to form the torsion suppression member 440, the torsion suppression member 440 may be formed by bending the quadrangular-shaped plate in the third direction D3.

Referring to FIGS. 3A and 4A again, a power supply module (not shown) which generates a power supply signal, a power supply unit which transmits the power supply signal generated by the power supply module to the radiator 120, and a ground unit (not shown) which grounds the radiator 120 are formed on the printed circuit board 140. The printed circuit board 140 is electrically connected to the radiator 120 through the conductive gasket 400. To this end, the printed circuit board 140 is electrically connected to the conductive gasket 400 and fixes the conductive gasket 400 onto the radiator 120 by compressing the conductive gasket 400 in the sixth direction D6.

Meanwhile, as described above, the antenna device 100 according to the present disclosure may further include the fixing rib 150 for fixing the conductive gasket 400. The fixing rib 150 is disposed to face the separation suppression member 450 with the conductive gasket 400 therebetween and fixes the conductive gasket 400.

Figure 6A:
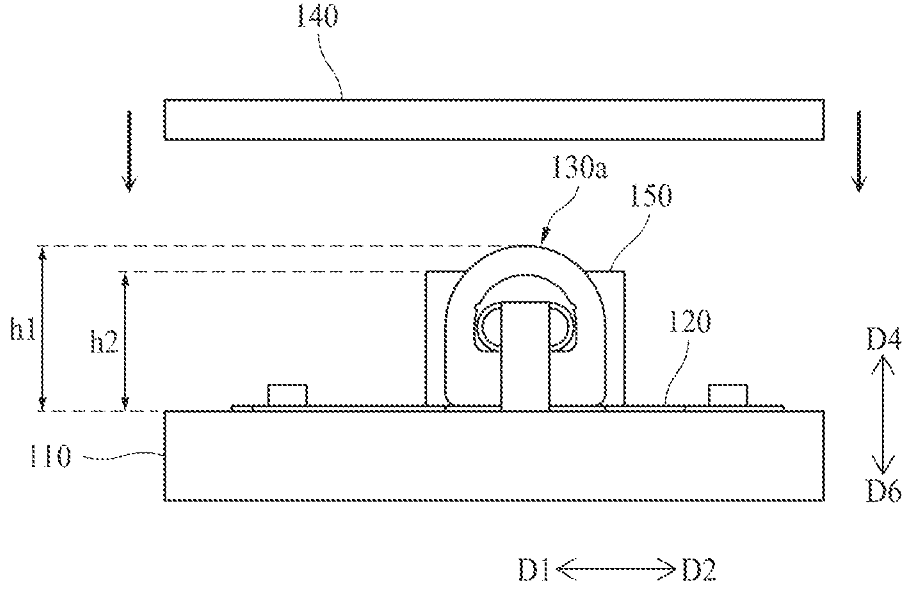
FIGS. 6A and 6B are views illustrating a state before the conductive gasket is compressed by a printed circuit board.
Figure 6B:
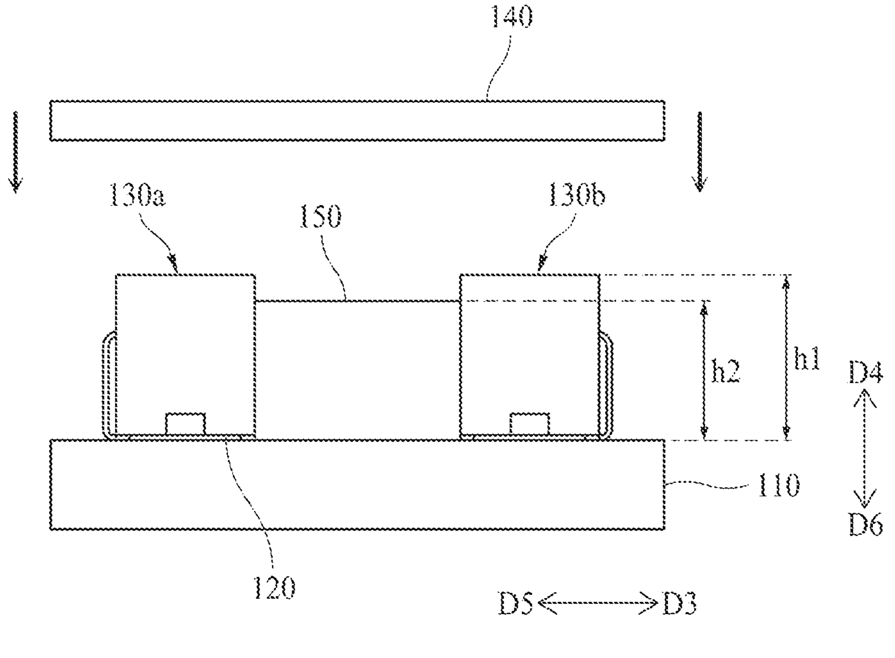
Figure 7A:
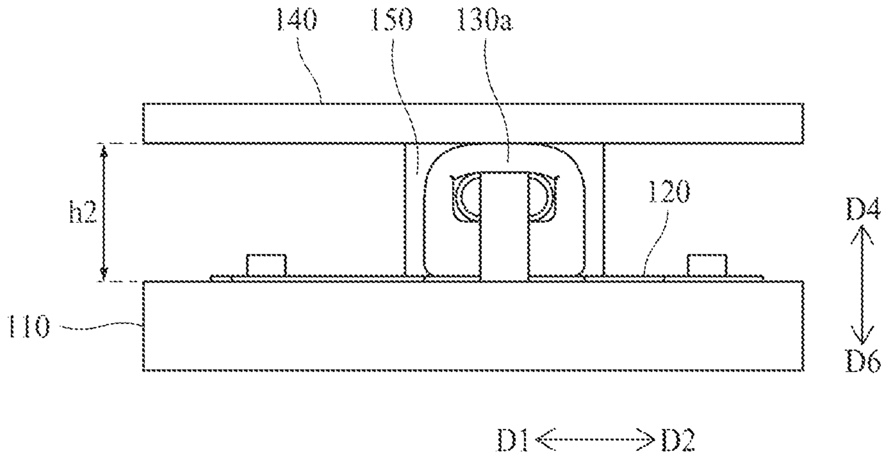
FIGS. 7A and 7B are views illustrating a state in which the conductive gasket is compressed by the printed circuit board.
Figure 7B:
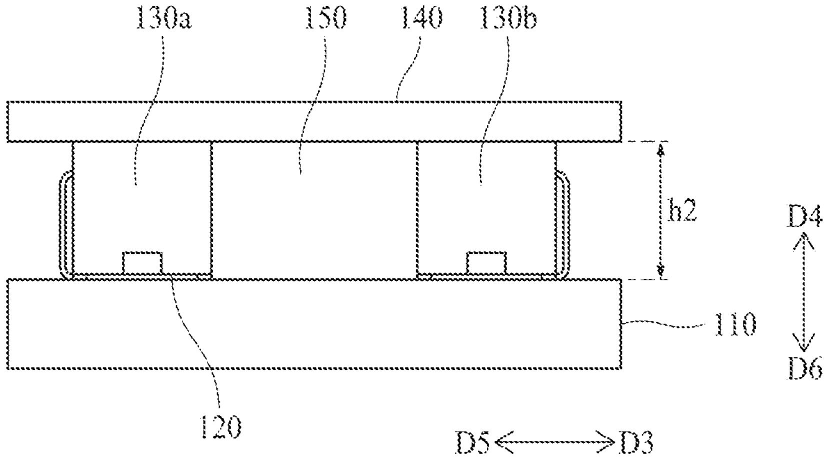

In one embodiment, the fixing rib 150 may be integrally formed with the carrier 110. According to this embodiment, as shown in FIGS. 6A and 6B, the fixing rib 150 may be formed on the carrier 110 to a second height h2 to come into contact with an outer wall 416 of the other side of the conductive gasket 400, and in this case, the second height h2 of the fixing rib 150 may be formed to be lower than the first height h1 of the conductive gasket 400. Accordingly, as shown in FIGS. 7A and 7B, the fixing rib 150 may serve as a stopper which guides the conductive gasket 400 to be compressed only up to an upper surface of the fixing rib 150 when the conductive gasket 400 is compressed by the printed circuit board 140.

In one embodiment, as shown in FIGS. 3 to 5, when the contact structures 130 include the first contact structure 130*a* and the second contact structure 130*b*, the first contact structure 130*a* may be electrically connected to the power supply unit formed on the printed circuit board 140, and the second contact structure 130*b* may be electrically connected to the ground unit formed on the printed circuit board 140.

According to this embodiment, in order to simultaneously fix the conductive gasket 400 of the first contact structure 130*a* and the conductive gasket 400 of the second contact structure 130*b* using only one fixing rib 150, the fixing rib 150 may be disposed between the first contact structure 130*a* and the second contact structure 130*b*.

According to the present disclosure, since the torsion and separation of a conductive gasket are prevented by a torsion suppression member inserted into a through hole of the conductive gasket which electrically connects a radiator and a printed circuit board and a separation suppression member disposed on an outer wall of one side of the conductive gasket, even when vibration or impact occurs while a device in which an antenna according to the present disclosure is installed is used, a stable electrical connection between the printed circuit board and the radiator is ensured, and accordingly, there is an effect that the antenna can be implemented with maximum performance.

Further, according to the present disclosure, there is an effect that a fixing force of the conductive gasket can be increased by adding a fixing rib disposed to face the separation suppression member with the conductive gasket interposed therebetween.

In addition, according to the present disclosure, since the conductive gasket can be coupled to the radiator through the torsion suppression member, the separation suppression member, and the fixing rib, and thus soldering for coupling the conductive gasket to the radiator is not required, a problem of a crack occurring in a lead component solidified by the soldering when the conductive gasket is compressed can be prevented, and accordingly, there is an effect that mechanical strength as well as electrical performance of the antenna can be improved.

In addition, according to the present disclosure, since the torsion suppression member inserted into the through hole of the conductive gasket is formed to have first and second lower curved plates, there is an effect that damage to an inner wall of the conductive gasket by friction between the torsion suppression member and the inner wall of the conductive gasket when the conductive gasket is compressed by the printed circuit board can be prevented.

In addition, according to the present disclosure, since an upper outer wall of the conductive gasket is formed in a curved shape, the compressed conductive gasket is uniformly spread to both sides when the conductive gasket is compressed by the printed circuit board, and thus the thickness distribution of the conductive gasket can be uniformly maintained. Accordingly, a current flow in the conductive gasket becomes uniform, and thus there is an effect that the performance of the antenna can be improved.

In addition, according to the present disclosure, since the conductive gasket is formed of a material having an elastic force, and thus an elastic force and a restoring force are constantly maintained even when a contact structure is repeatedly used, there is an effect that the reliability of electrical contact between the radiator and the printed circuit board can be secured.

Those skilled in the art may understand that the present disclosure may be embodied in other specific forms without changing the technical spirit or essential features of the present disclosure.

Accordingly, the above-described embodiments should be understood as being exemplary and not limiting. Further, the scope of the present disclosure will be shown by the appended claims rather than the above-described detailed description, and all possible changes or modifications in forms derived from the meaning and the scope of the claims and equivalents thereof should be understood as being within the scope of the present disclosure.

What is claimed is:

1. An antenna device having a contact structure using a conductive gasket, the antenna device comprising:

a radiator on a carrier;

a printed circuit board configured to supply a power supply signal to the radiator; and a first contact structure configured to electrically connect the radiator and the printed circuit board, wherein the first contact structure includes:

the conductive gasket with a through hole therein, the conductive gasket having a first height on the radiator and being compressed by the printed circuit board to be fixed onto the radiator;

a torsion suppressor inserted into the through hole, thereby being inserted into the conductive gasket to suppress torsion of the conductive gasket; and a separation suppressor configured to extend from the radiator along an outer wall of a first side of the conductive gasket in a height direction of the conductive gasket to suppress separation of the conductive gasket.

2. The antenna device of claim 1, wherein the torsion suppressor is integrated with the separation suppressor, and the torsion suppressor is formed by bending a portion of the separation suppressor.

3. The antenna device of claim 1, wherein the torsion suppressor includes:

a flat plate extending from one end of the separation suppressor into the through hole;

a first lower curved plate bent from a first side of the flat plate in a direction of a lower inner wall of the conductive gasket in the through hole; and a second lower curved plate bent from a second side of the flat plate in the direction of the lower inner wall of the conductive gasket in the through hole, the second side of the flat plate being opposite to the first side of the flat plate based on the flat plate.

4. The antenna device of claim 3, wherein the flat plate is located to be spaced apart from an upper inner wall of the conductive gasket in the through hole when the conductive gasket is not compressed, and the flat plate is configured to guide the upper inner wall of the conductive gasket to be compressed up to an upper surface of the flat plate when the conductive gasket is compressed.

5. The antenna device of claim 4, wherein an upper outer wall of the conductive gasket is configured to have a curvature.

6. The antenna device of claim 5, wherein the upper inner wall of the conductive gasket is configured to have a same curvature as the upper outer wall of the conductive gasket.

7. The antenna device of claim 1, further comprising a fixing rib disposed to face the separation suppressor with the conductive gasket interposed therebetween to fix the conductive gasket.

8. The antenna device of claim 7, wherein the fixing rib is configured to contact with a second side of the conductive gasket and have a second height lower than the first height on the carrier, and wherein the second side of the conductive gasket is opposite to the first side of the conductive gasket based on the conductive gasket.

9. The antenna device of claim 7, wherein the fixing rib is integrated with the carrier.

10. The antenna device of claim 7, wherein the fixing rib is configured to guide the conductive gasket to be compressed up to an upper surface of the fixing rib when the conductive gasket is compressed by the printed circuit board.

11. The antenna device of claim 1, wherein the conductive gasket includes a body of a silicon material, and a metal layer on an outer surface of the body to surround the body.

12. The antenna device of claim 1, further comprising a second contact structure configured to electrically connect the radiator to the printed circuit board and, a fixing rib disposed between the first contact structure and the second contact structure to simultaneously fix the conductive gasket of the first contact structure and a conductive gasket of the second contact structure.

13. The antenna device of claim 1, wherein the torsion suppressor includes:

a base plate extending from one end of the separation suppressor into the through hole;

a first upper curved plate bent from a first side of the base plate in a direction of an upper inner wall of the conductive gasket in the through hole; and a second upper curved plate bent from a second side of the base plate in the direction of the upper inner wall of the conductive gasket in the through hole, the second side of the base plate being opposite to the first side of the base plate based on the base plate.

* * * * *